United States Patent Office 3,701,568
Patented Oct. 31, 1972

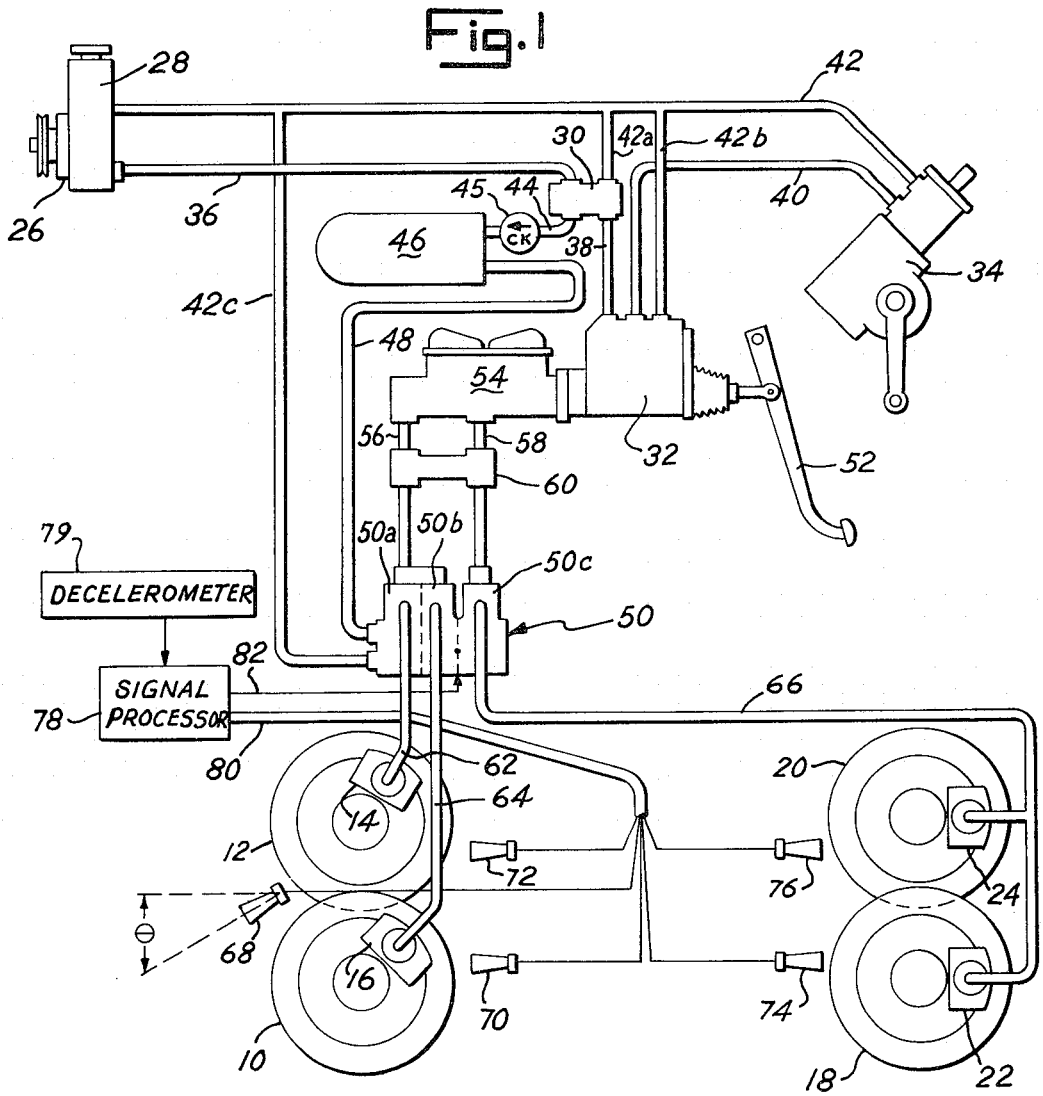

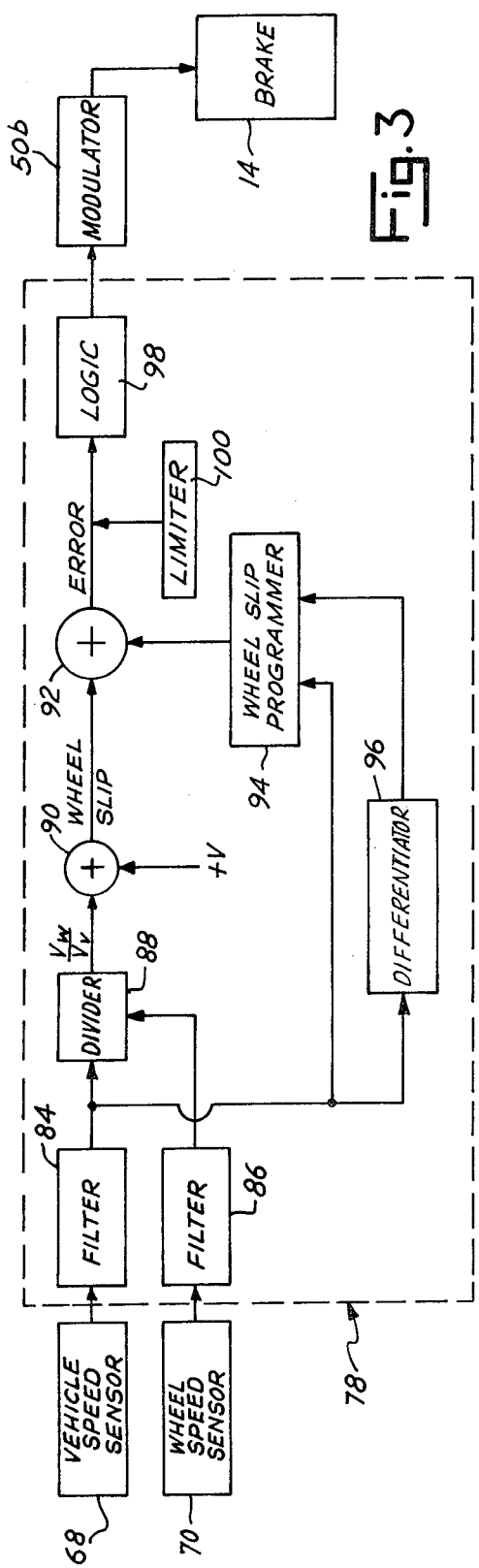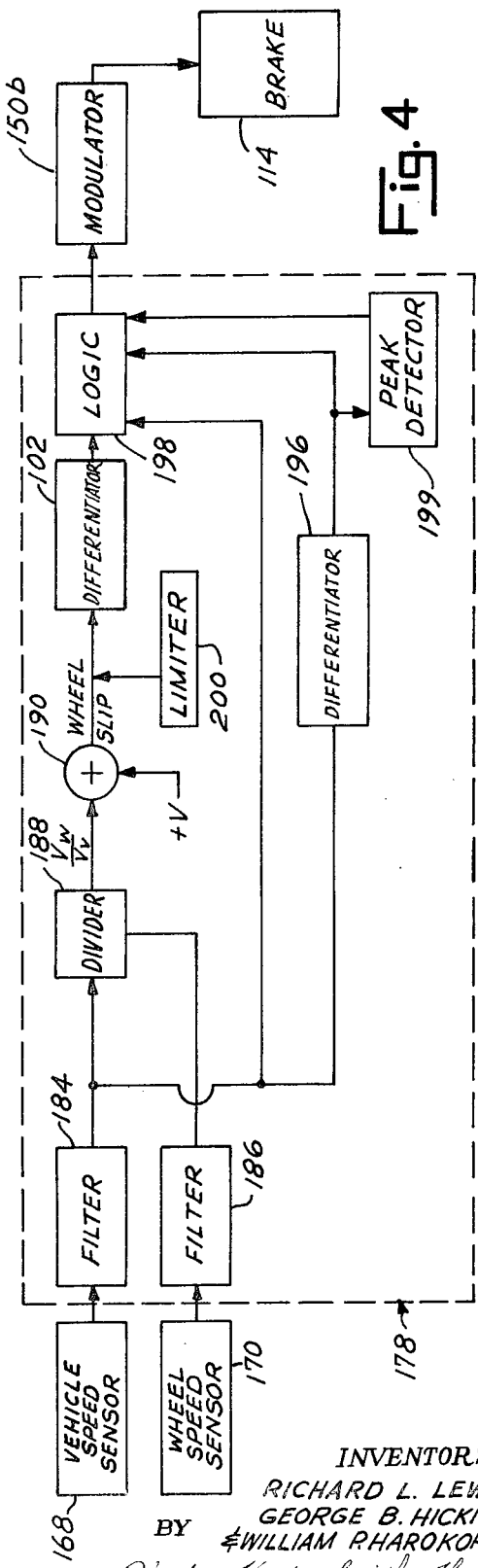

3,701,568
ADAPTIVE BRAKING SYSTEM UTILIZING DOPPLER RADAR
Richard L. Lewis, St. Joseph, Mich., George B. Hickner, South Bend, Ind., and William P. Harokopus, Southfield, Mich., assignors to The Bendix Corporation
Filed Sept. 30, 1970, Ser. No. 76,953
Int. Cl. B60t 8/10
U.S. Cl. 303—21 P
7 Claims

ABSTRACT OF THE DISCLOSURE

An adaptive braking system for a vehicle in which Doppler radar devices are used to measure wheel speeds and vehicle speed and provide electrical signals proportional thereto. These signals are processed and combined to provide further signals proportional to wheel slip, rate of change of wheel slip and vehicle acceleration. A system for detecting peaks of vehicle acceleration and transmitting a signal indicating the occurrence of such a peak may also be included. These several signals are transmitted to a programmer and/or logic element. Outputs from the programmer and/or logic element are received by brake pressure modulators to vary the pressure applied by the operator thereby maintaining maximum braking torque. A limiter can be incorporated to prevent slip values between the tire and road surface from exceeding some predetermined maximum.

BACKGROUND OF THE INVENTION

This invention relates to an adaptive braking system for use in an automobile. More specifically, it is an improvement of adaptive braking systems such as that described in U.S. Patent No. 3,494,671. While the brake pressure modulators of the patent are described as air or vacuum operated, the invention is shown as employing hydraulically powdered modulators of the type described in detail in U.S. patent application No. 831,949 filed on June 10, 1969, now Patent No. 3,610,702 having the same assignee as this application. The system is also shown as employing a hydraulically powered booster brake of the type described in detail in U.S. patent application No. 794,472 filed on Jan. 15, 1969, now Patent No. 3,532,027 also having the same assignee as this application.

A problem arising with systems, such as that of the patent just referred to, is that there has been no practical way of directly measuring vehicle velocity. Since all wheels are braked, each wheel is producing some percentage slip. As a result, it has been impossible to deterimne the actual slip which exists at any time. Most systems rely on complicated logic to deduce the slip condition and control the wheel braking accordingly. Also, in previous systems, such as that of the mentioned patent, wheel velocity data has been obtained by means of sensors involving relatively movable parts which must be held in close proximity. Deflection of vehicle suspension components under varying spring loads and braking torques has rendered this difficult. Other sensors have involved geared or frictional drives and have required high speed bearings all operating in an extremely unfavorable environment. This has created problems of durability and reliability which have been resolved only with great difficulty and at high cost.

Fixed slip systems have been tried on vehicles having one or more unbraked wheels such as certain tractor-trailer combinations. It was quickly discovered that vehicle braking performance on various types of road surfaces was not always improved and, in many cases, was seriously degraded. Growing knowledge of the varying relationship of the friction coefficient with road surface type, with vehicle speed and with vehicle acceleration, has shown why a fixed slip system does not provide optimum braking.

SUMMARY OF THE INVENTION

Therefore, it is an object of this invention to provide a vehicle adaptive braking system in which vehicle velocity data is available for direct determination of wheel slip.

A further object is to provide a vehicle adaptive braking system employing Doppler radar to determine vehicle velocity.

A still further object is to provide a vehicle adaptive braking system in which actual wheel slip is compared to, and controlled in accordance with, a programmed slip value.

Yet another object is to provide a vehicle adaptive braking system in which the programmed slip value is appropriately varied as a function of vehicle speed and acceleration.

Another object is to provide a vehicle adaptive braking system in which set points are varied in accordance with data received from a vehicle acceleration peak seeking device.

Still another object is to provide a vehicle adaptive braking system employing Doppler radar to determine wheel speeds.

The detailed construction of the Doppler radar speed sensing devices may be in accordance with systems described in U.S. patent application Ser. No. 76,408 filed Sept. 29, 1970, and 42,651 filed on June 2, 1970, having a common assignee with this application.

BRIEF DESCRIPTION OF THE DRAWINGS

FIG. 1 is an illustrative diagram of an adaptive braking system for an automotive vehicle including radar wheel and vehicle speed sensors.

FIG. 2 is a graph of a family of $\mu$-slip curves showing how the desired percent slip may vary.

FIG. 3 is a block diagram of the signal processor indicated in FIG. 1.

FIG. 4 is an alternate block diagram of the signal processor shown in FIG. 1.

DETAILED DESCRIPTION OF THE INVENTION

Referring now to the drawing there is shown in FIG. 1 the braking system of an automotive vehicle having two front wheels 10 and 12 equipped with disc brakes 14 and 16, and two rear wheels 18 and 20 equipped with disc brakes 22 and 24. The vehicle has an open center hydraulic system comprising an engine driven pump 26 provided with an integral reservoir 28, a charging valve 30 of a type described in U.S. Patent No. 2,977,761, a brake booster 32 and a steering gear 34. Fluid flows from the pump 26 to the charging valve 30 through a conduit 36, through the charging valve to the brake booster 32 by means of a conduit 38, and through the brake booster to the steering gear 34 by means of a conduit 40. A conduit 42 returns fluid from the steering gear 34 to the pump reservoir 28. Branches 42a and 42b of conduit 42 return to the reservoir 28 small quantities of fluid which bypassed the operation of the brake booster 32 and the charging valve 30, respectively.

The vehicle also has a closed center hydraulic system which receives fluid from the charging valve and delivers it through a conduit 44 containing a check valve 45 to an accumulator 46. Fluid from the accumulator is delivered by a conduit 48 to a three element brake pressure modulator 50 as shown in previously mentioned application No. 831,949, now Patent No. 3,616,702. Functionally, each element 50a, 50b and 50c operates as a separate modulator, but for economy purposes they are combined in one structure shown as modulator 50. A third branch 42c of the conduit 42 conveys used fluid back to the pump reservoir 28.

The brake booster 32 is operated by a brake pedal 52 and actuates a split master cylinder 54. The master cylinder 54 delivers fluid for the front brakes through a conduit 56 to two elements 50a and 50b of the brake pressure modulator 50. The master cylinder 54 delivers fluid for the rear brakes through a conduit 58 to the remaining element 50c of the brake pressure modulator 50. Conduits 56 and 58 both pass through a conventional failure warning switch 60. Fluid is delivered from the elements 50a, 50b and 50c of the brake pressure modulator 50 to each of the front brakes 14 and 16 and to the pair of rear brakes 22 and 24 by three conduits 62, 64 and 66, respectively.

A radar device 68, operating on the Doppler principle, is mounted on the vehicle so that it transmits high frequency signals to the road surface at a predetermined angle and recevies back reflections of these signals. These signals may be converted into a signal proportional to vehicle speed as shown in previously mentioned application 76,408, filed Sept. 29, 1970. In general terms, the Doppler radar device 68 can be of the type that continuously generates a high frequency signal in a generator mixer cavity by means of a Gunn device. The signal generated in the cavity is radiated through an antenna towards the ground at an angle $\theta$. Portions of the radiated signal are reflected back into the antenna, and subsequently the generator-mixer, with a shift in the reflected signal being proportional to the relative velocity between the antenna and the reflecting surface. The device 68 being attached to the car and the reflecting surface normally being the road, the reflected signal is proportional to the vehicle velocity. In the cavity, the transmitted and reflected signals are mixed and filtered to give a difference frequency proportional to vehicle velocity. A maximum amplitude of the difference frequency, commonly known as Doppler frequency, can be obtained by tuning between the generator-mixer cavity and the antenna. By appropriate logic, the Doppler frequency can be amplified and converted to a linear voltage with respect to vehicle velocity. For further details see previously mentioned application Ser. No. 76,408 filed Sept. 29, 1970 and Ser. No. 42,651.

Similarly, four other radar devices 70, 72, 74 and 76 are mounted on the vehicle so that each transmits signals to a moving surface of one of the vehicle wheels 10, 12, 18 and 20, respectively, and receives back reflected signals which are converted into signals proportional to wheel speed. It should be understood that the conventional wheel speed sensors, i.e., the magnetic pickup type, can be used instead of Doppler type sensors for detecting wheel rotational velocity. All five of the speed signals are transmitted to a signal processor 78 by means of suitable electrical conductors 80 along with an input from the decelerometer 79. The signal processor 78 is constructed and arranged to produce brake pressure control signals which are transmitted through electrical conductors 82 to the brake pressure modulator 50 to control its operation as described in the above referred to patents and patent applications. It will be understood that the signal processor 78 contains, in the illustrated case, three parallel channels, two of which serve to independently control the front wheels 10 and 12, and the third of which controls the rear wheels 18 and 20 together. Each of these channels acts in cooperation with one of the three elements 50a, 50b and 50c of the brake pressure modulator 50.

Though the present invention is shown with a wheel speed sensor for each wheel, a smaller number may be used in other adaptive braking systems. For example, only one wheel of the rear wheels may be used to control the rear wheel modulator element 50c. Another example would be to have a drive-line sensor for detecting the average speed of the rear wheels. For an economic rear system that will not function as well as the present system, a single sensor may be used to sense wheel speed, a single modulator may vary pressure in all four wheels and a proportioning valve may vary pressure between front and rear wheels according to the load shift. It will be obvious to one skilled in the art that many different combinations of types and number of wheel speed sensors may be used in an adaptive braking. However, before the present invention, no economic means has been available to directly measure vehicle speed and wheel speed sensors have been expensive to manufacture.

Only one of these channels is illustrated as a block diagram in FIG. 3. The numerals applied to this figure relate it to the channel which controls the front wheel 10. In this figure the vehicle speed sensor 68 and the wheel speed sensor 70 are shown as blocks putting signals into the signal processors 78 which is made up of the elements enclosed by the dashed line. Within the signal processor these signals pass through filters 84 and 86, respectively, and are combined in a divider 88 to produce the function $V_w/V_v$. This function is combined with a constant voltage $+V$ in an adder 90 to provide the function "wheel slip." This is compared in adder 92 with the output of a wheel slip programmer 94. The wheel slip programmer 94 receives inputs of vehicle speed and vehicle deceleration. The latter signal is provided by a differentiator block 96 which receives the vehicle speed signal and converts it into a signal proportional to vehicle deceleration. The output of the adder 92 constitutes an error signal or difference of actual slip to programmed slip. This error signal is put into a logic element 98 which determines the necessary signals to be transmitted to the modulator element 50b whereby it modulates the pressure transmitted to the brake 14 to reduce or eliminate the error. The logic element 98 is preferably made pursuant to the teachings of the aforementioned U.S. Patent No. 3,494,671. A limiter 100, which may not be absolutely necessary, serves to prevent the total slip from exceeding some predetermined value such as 35 percent.

In the alternate block diagram of FIG. 4, like parts are designated by the same numerals plus 100. In this system the "wheel slip" signal produced by the adder 190 is put into another differentiator represented by a block 102 and the output of this differentiator, representing time rate of change of slip, is applied to a logic block 198. The logic 198 is provided with "set points." As the rate of change of slip equals or passes through these "set points," the logic block 198 dictates the issuance of signals or commands to the modulator portion 150b. These commands are designed to control the brake 114 to maintain a substantially constant slip. However, the controlled slip is not a fixed value as the inputs to the logic block 198 of vehicle speed and deceleration are used to modify the "set points" to adapt the system to the road and tire conditions that are deduced to exist as a result of the vehicle's response to braking. The logic element 198 is preferably made pursuant to the teachings of the aforementioned U.S. Patent No. 3,494,671. A peak detector 199, receiving the vehicle deceleration signals from the differentiator 196, signals the logic block 198 whenever vehicle deceleration reaches a maximum, giving the logic block 198 more information of road surface conditions upon which to base the changes in "set points" which are required for most perfect adaptation to the road-tire conditions. Again, slip is prevented from exceeding a desirable maximum value by a limiter 200.

OPERATION OF THE INVENTION

When the vehicle is in motion with the engine running, the pump 26 delivers a controlled flow of 1½ to 2 g.p.m. (gallons per minute) through the charging valve 30 and thence the open center valving of the brake booster 32 and the steering gear 34. The charging valve 30 maintains fluid under pressure in the accumulator 46. Its specific operation is explained in detail in the above referred to U.S. Patent No. 2,977,761, but briefly, if the pressure in the accumulator 46 falls to a low limit such as 800 p.s.i., the charging valve 30 diverts a portion of the pump flow, e.g. about .10 to .15 g.p.m., into the accumulator. This diversion is continued until the accumulator pressure is raised to a level such as 1000 p.s.i. The charging valve is designed to restrict the pump flow as necessary to raise the pressure in the accumulator 46.

When the driver operates the brakes by pushing the pedal 52, the booster 32 operates the master cylinder 54 in the manner described in detail in the above referred to patent application Ser. No. 794,472 and Pat. No. 3,532,027. Brake fluid under pressure from the master cylinder 54 passes through the several elements 50a, b and c of the brake pressure modulator 50 and enters the wheel cylinders of the brakes 14, 16, 22 and 24. The brakes act in the well-known manner to retard rotation of the wheels 10, 12, 18 and 20, and the wheels, through their contact with the road surface, decelerate the vehicle.

FIG. 2 shows a family of curves which illustrate how the coefficient of friction ($\mu$) varies with road conditions and with wheel slip. The location of the line marked "desired percent slip" is obvious and this family of curves clearly illustrates that percent slip must be varied by the adaptive braking system in order to obtain optimum braking. The highest of the three curves may represent a dry rough concrete road surface. The middle curve may represent the same road surface wet with rain. The bottom curve may be the same road surface covered with packed snow. If the driver's need for vehicle deceleration is met on the forward side of the $\mu$-slip curve, the signals from the radar devices 68, 70, 72, 74 and 76 will be of such character that the adaptive braking system remains quiescent and braking is left to the complete control of the driver. However, if an emergency exists, causing the driver to exert maximum force on the pedal 52; or, if the road surface coefficient is low, due to rain, snow or ice, the peak tractive capability of the tires on the road is exceeded, and slip of one or more of the tires will quickly exceed the initially programmed slip. The error signal thus generated triggers the logic block 98 or 198 to issue commands to the modulator 50.

The operation of the modulator is explained in detail in the above referred to U.S. Pat. No. 3,532,027, but, in general, the commands from block 98 or 198 are in the form of electrical voltages which operate suitable solenoid valves (not shown) to admit pressurized fluid from the accumulator 46 to operating cylinders (not shown) of the pressure modulator 50. The operating cylinders, in turn, operate brake pressure regulating pistons (not shown) and check valves (not shown). The first signal from the signal processor 78 causes the appropriate element of the modulator 50 to interrupt communication between the brakes 14, 16 or 22 and 24 and the master cylinder 54 by closing the check valves. This is followed by reduction of brake pressure. The reduction in brake pressure reduces the brake torque and consequent wheel retardation and tends to bring "wheel slip" back to the programmed value. Subsequent commands halt the pressure reduction, and particularly if slip now falls below the programmed value, commands are issued to raise the brake pressure as needed. The logic systems are explained in detail in above referred to U.S. Pat. No. 3,494,671 and are explained herein only to the extent deemed necessary for illustration of the system of the invention. In the meantime, the programmer 94, as shown in FIG. 3, modifies the slip program in accordance with the vehicle speed and acceleration data it is receiving. In the case of FIG. 4, the logic system modifies or alters its "set points" in response to similar data. The $\mu$-slip curves of FIG. 2 clearly illustrate the value of the information supplied by the peak detector 199.

If the driver maintains heavy pressure on the pedal 52, the system will control braking until the vehicle comes to a halt, continuing to lower and raise pressure in the brake wheel cylinders as needed. However, if the need for deceleration passes and the driver releases the pedal 52, the brakes will be released immediately, since the check valves in the modulator freely permit back flow to the master cylinder 54 whenever its pressure is reduced below the pressure being maintained by the modulator 50. Thus, it will be observed that the driver retains full control of the system except for those periods when he attempts to obtain braking in excess of existing tractive capabilities. By the use of the radar devices, a positive slip control can be maintained. By use of the slip programmer 94 in the one case, or varying "set points" in the logic block 198 in the other case, the actual slip to which the vehicle is controlled is continuously varied to match road conditions and, thereby, provide truly optimum braking.

We claim:

1. In an adaptive braking system for a vehicle having wheels equipped with fluid-operated brakes:
   first means generating a first signal proportional to the rotational speed of a vehicle wheel;
   second means generating a second signal proportional to the speed of said vehicle;
   means for dividing said first signal by said second signal to produce a third signal proportional to wheel slip;
   means differentiating said second signal to generate a fourth signal proportional to acceleration and deceleration of said vehicle; and
   logic means responsive to said second signal, said third signal, and said fourth signal, said logic means producing an output signal when said second, third and fourth signals bear a predetermined relationship to one another; and
   modulating means responsive to the output signal of said logic means to relieve braking pressure delivered to a corresponding brake.

2. The invention of claim 1, wherein said first and second means include Doppler radar speed sensors.

3. The invention of claim 2: said logic means including programming means responsive to said second and fourth signals for producing a fifth output signal, the value of which is programmed according to the values of said second and fourth signals, means responsive to said fifth signal and said third signal for producing an error signal proportional to the difference between said fifth signal and said third signal, and an element responsive to said error signal for actuating said modulating means.

4. The invention of claim 3: said logic means including means for limiting the value of said error signal to a predetermined maximum.

5. The invention of claim 2: said logic means including means for differentiating said third signal to generate a sixth signal proportional to the time rate of change of said third signal and an element responsive to said sixth signal, said second signal, and said fourth signal for actuating said modulating means.

6. The invention of claim 5: said logic means including means to limit the value of said third signal to a predetermined maximum.

7. The invention of claim 6: said logic means including means responsive to said fourth signal for sensing relative maximum values thereof to produce a seventh signal whenever said fourth signal passes through a peak value, said seventh signal being transmitted to said element.

References Cited

UNITED STATES PATENTS

| | | | |
|---|---|---|---|
| 3,583,773 | 6/1971 | Steinbrenner et al. | 303—20 X |
| 3,586,387 | 6/1971 | Riordan et al. | 303—21 BE UX |
| 3,362,757 | 1/1968 | Marcheron | 303—21 P |
| 3,554,612 | 1/1971 | Harned | 303—21 BE |
| 3,545,817 | 12/1970 | Yarber | 303—21 P |
| 3,532,393 | 10/1970 | Riordan | 303—21 BE |
| 3,466,097 | 9/1969 | Flook, Jr. | 303—21 R |
| 3,525,553 | 8/1970 | Carp et al. | 303—21 P |
| 3,578,819 | 5/1971 | Atkins | 303—21 P |

MILTON BUCHLER, Primary Examiner

S. G. KUNIN, Assistant Examiner

U.S. Cl. X.R.

303—20; 343—8